(12) United States Patent
Määttä

(10) Patent No.: US 9,840,861 B1
(45) Date of Patent: Dec. 12, 2017

(54) HINGED DEVICE WITH SNAP OPEN LOCK

(71) Applicant: Microsoft Technology Licensing, LLC, Redmond, WA (US)

(72) Inventor: Esa-Sakari Määttä, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/182,311

(22) Filed: Jun. 14, 2016

(51) Int. Cl.
*E05D 11/10* (2006.01)
*E05D 1/00* (2006.01)
(Continued)

(52) U.S. Cl.
CPC ............ *E05D 11/105* (2013.01); *E05D 1/00* (2013.01); *E05D 11/0081* (2013.01);
(Continued)

(58) Field of Classification Search
CPC ....... Y10T 16/54024; Y10T 16/540247; Y10T 16/54025; Y10T 16/540256; Y10T 16/540257; Y10T 16/54048; Y10T 16/5406; Y10T 16/5407; Y10T 16/5409; Y10T 16/54095; Y10T 16/5453; Y10T 16/5457; Y10T 16/551; Y10T 16/54028; Y10T 16/540255; Y10T 16/5387; Y10T 16/5401; Y10T 16/525; Y10T 16/6295; Y10T 292/11; F16M 11/10; F16M 11/24; F16M 11/2021; F16M 11/04; F16M 13/00; F16M 2200/041; F16M 2200/044; F16M 2200/047; F16M 2200/048; F16M 2200/08; Y10S 248/917; Y10S 248/919;
(Continued)

(56) References Cited

U.S. PATENT DOCUMENTS 1,819,212 A * 8/1931 Toncray .................. E05C 17/36
16/82
1,837,517 A * 12/1931 Ball ........................ E05C 17/36
16/82
(Continued)

FOREIGN PATENT DOCUMENTS

CN 101150938 A 3/2008
EP 1659764 A1 5/2006
(Continued)

OTHER PUBLICATIONS

Mraz, "Care and feeding of living hinges," http://machinedesign.com/fasteners/care-and-feeding-living-hinges, 3 pages, dated Aug. 19, 2004.
(Continued)

*Primary Examiner* — Chuck Mah
(74) *Attorney, Agent, or Firm* — Klarquist Sparkman, LLP (57) ABSTRACT

A hinge mechanism is described wherein a multi-part device (e.g., dual-display device) can move to a snap-open position. In the snap-open position, the parts lock into place when they approach 180 degrees of rotation relative to one another. The locking force in the open position is sufficient that holding or using the multi-part device does not cause an accidental closing action. An unlocking force is required to unlock the device from the open position. Additionally, the locking force drops off precipitously when the two parts are unlocked and rotating away from the locked position.

21 Claims, 9 Drawing Sheets

(51) Int. Cl.
*E05D 11/00* (2006.01)
*G06F 1/16* (2006.01)
*H04M 1/02* (2006.01)

(52) U.S. Cl.
CPC ........ *E05D 11/1007* (2013.01); *G06F 1/1681* (2013.01); *H04M 1/0214* (2013.01); *E05Y 2900/606* (2013.01)

(58) Field of Classification Search
CPC . E05D 11/10; E05D 11/1007; E05D 11/1028; E05D 11/105; E05D 11/1078; E05D 11/06; E05D 11/0081; E05D 11/104; E05D 1/00; E05Y 2900/606; E05Y 2201/46; G06F 1/1681; G06F 1/1679; G06F 1/1601; E05C 19/16; H04M 1/0214
See application file for complete search history.

(56) References Cited

U.S. PATENT DOCUMENTS

| | | | | |
|---|---|---|---|---|
| 1,903,923 | A * | 4/1933 | Hyde | E05F 1/1041 16/50 |
| 2,568,225 | A * | 9/1951 | Doman | E05F 1/1041 16/292 |
| 2,709,275 | A * | 5/1955 | Johnson | E05C 17/24 16/332 |
| 3,016,563 | A * | 1/1962 | De Jong | E05C 19/16 16/320 |
| 3,562,850 | A * | 2/1971 | Eliason et al. | E05C 17/56 16/320 |
| 3,588,946 | A * | 6/1971 | MacDonald | E05F 1/1253 16/224 |
| 4,301,570 | A * | 11/1981 | Thomas | E05D 11/06 16/85 |
| 4,393,541 | A * | 7/1983 | Hujsak | B25J 17/0241 16/291 |
| 4,991,256 | A * | 2/1991 | Jeynes | E05F 1/105 16/61 |
| 5,120,030 | A * | 6/1992 | Lin | F16F 6/00 188/267 |
| 6,311,367 | B1 * | 11/2001 | Larsen | E05F 3/221 16/375 |
| 6,484,016 | B1 | 11/2002 | Cheon | |
| 6,507,485 | B2 | 1/2003 | Zadesky | |
| 6,659,516 | B2 | 12/2003 | Wang | |
| 6,798,649 | B1 | 9/2004 | Olodort et al. | |
| 6,929,291 | B2 | 8/2005 | Chen | |
| 7,097,608 | B2 | 8/2006 | Merkli | |
| 7,117,562 | B2 | 10/2006 | Zuo et al. | |
| 7,155,266 | B2 | 12/2006 | Stefansen | |
| 7,232,313 | B1 | 6/2007 | Shinoda | |
| 7,489,778 | B2 | 2/2009 | Lee | |
| 7,593,524 | B2 | 9/2009 | Maenpaa | |
| 7,779,509 | B2 | 8/2010 | Jian | |
| 7,787,912 | B2 | 8/2010 | Saila | |
| 8,019,395 | B2 | 9/2011 | Pan et al. | |
| 8,161,604 | B2 | 4/2012 | Lin et al. | |
| 8,364,214 | B2 | 1/2013 | Jorgensen et al. | |
| 8,451,601 | B2 | 5/2013 | Bohn et al. | |
| 8,576,031 | B2 | 11/2013 | Lauder | |
| 8,746,645 | B2 * | 6/2014 | Knych | F16M 11/10 248/346.01 |
| 9,013,867 | B2 | 4/2015 | Becze et al. | |
| 9,264,713 | B2 | 2/2016 | Joshi | |
| 9,476,238 | B2 * | 10/2016 | Mooers | E05F 1/12 |
| 2004/0134029 | A1 * | 7/2004 | Horn | E05D 1/04 16/280 |
| 2005/0225393 | A1 | 10/2005 | Lee et al. | |
| 2007/0019378 | A1 | 1/2007 | Kwon | |
| 2007/0072658 | A1 | 3/2007 | Cheng | |
| 2007/0182663 | A1 | 8/2007 | Biech | |
| 2007/0261798 | A1 | 11/2007 | Hung et al. | |
| 2008/0037624 | A1 | 2/2008 | Walker et al. | |
| 2008/0074858 | A1 | 3/2008 | Hori et al. | |
| 2009/0049646 | A1 | 2/2009 | Rubin et al. | |
| 2009/0179133 | A1 * | 7/2009 | Gan | F16M 11/105 248/422 |
| 2009/0265890 | A1 | 10/2009 | Endo et al. | |
| 2010/0065702 | A1 * | 3/2010 | Hsu | F16M 11/10 248/231.9 |
| 2010/0171671 | A1 * | 7/2010 | Park | F16M 11/10 343/720 |
| 2010/0252710 | A1 * | 10/2010 | Yang | F16M 11/10 248/398 |
| 2011/0126469 | A1 * | 6/2011 | Uto | E02F 9/00 49/397 |
| 2012/0120618 | A1 | 5/2012 | Bohn | |
| 2013/0010405 | A1 | 1/2013 | Rothkopf et al. | |
| 2013/0068902 | A1 * | 3/2013 | Huang | F16M 11/10 248/188.8 |
| 2013/0077211 | A1 * | 3/2013 | Wang | G06F 1/1637 361/679.01 |
| 2013/0305489 | A1 * | 11/2013 | Liang | G06F 1/1681 16/277 |
| 2014/0175253 | A1 * | 6/2014 | Huang | F16M 11/105 248/558 |
| 2014/0268533 | A1 | 9/2014 | Meyers et al. | |
| 2014/0299602 | A1 * | 10/2014 | Manssourian | B65F 1/1615 220/315 |
| 2014/0328041 | A1 | 11/2014 | Rothkopf et al. | |
| 2015/0184438 | A1 * | 7/2015 | Varadarajan | G06F 1/1679 16/327 |
| 2015/0345194 | A1 * | 12/2015 | Kadus | E05D 11/0054 16/320 |
| 2015/0378400 | A1 | 12/2015 | Sprenger et al. | |
| 2016/0048165 | A1 | 2/2016 | Becze | |

FOREIGN PATENT DOCUMENTS

| | | |
|---|---|---|
| EP | 2112311 A1 | 10/2009 |
| EP | 2406939 B1 | 6/2014 |
| WO | WO2012128489 | 9/2012 |

OTHER PUBLICATIONS

"Ezy-Jamb invisible hinges", Published on: Jun. 15, 2012, Available at: http://studcosystems.com.au/ezy-jamb-invisible-hinges.html, 2 pages.
http://images.pcworld.com/reviews/graphics/products/imported/31044_g3.jpg, Nokia E90 Communicator, downloaded Sep. 13, 2010, 1 page.
http://machinedesign.com/article/sleek-designs-hinge-on-strong-rotary-joints-1104, Machinedesign.com, downloaded Sep. 13, 2010, 5 pages.
http://www.nvtools.co.uk/images/main/main_soss.jpg, SOSS Hinge, downloaded Sep. 13, 2010, 1 page.
"Invisible Adjustable Hinge with Screws for Doors—160×32mm—Nickel Plated Finish", Retrieved on: Apr. 6, 2016, Available at: http://www.benzoville.com/concealed-hinges/invisible-adjustable-hinge-with-screws-for-doors-/12507/index.aspx, 3 pages.
Kelander, et al., "Modeling for High-Speed Interconnects in Mobile Device Hinge Structures", In Proceedings of 1st Electronic System Integration Technology Conference, pp. 485-490.
Khalilbeigi, et al., "FoldMe: Interacting with Double-sided Foldable Displays", In Proceedings of Sixth International Conference on Tangible, Embedded and Embodied Interaction, Feb. 19, 2012, pp. 33-40.
"Lenovo Stretches Innovation With New Ideapad Yoga Flip and Fold Device", Jan. 9, 2012, available online at: <http://news.lenovo.com/news-releases/lenovo-stretches-innovation-with-new-ideapad-yoga-flip-and-fold-device.htm>, 2 pages.
Office Action (with an English translation) for related Chinese Patent Application No. 201110382425.X, 18 pages, dated Dec. 5, 2013.
Office Action (with an English translation) for related Chinese Patent Application No. 201110382425.X, 6 pages, dated Jul. 15, 2014.

(56) References Cited

OTHER PUBLICATIONS

"Sell concealed invisible hinge for wooden door", Published on: May 21, 2012, Available at: http://93163.en.ec21.com/offer_detail/Sell_concealed_invisible_hinge_for--18379891.html?gubun=S, 2 pages.

Talocia et al., "Signal Integrity constrained optimization of flexible printed interconnects for mobile devices," IEEE, 3:636-641, Aug. 14-18, 2006.

* cited by examiner

HINGED DEVICE WITH SNAP OPEN LOCK

BACKGROUND

Modern mobile phones and tablets have evolved over recent years to the point where they now possess a broad range of capabilities. They are not only capable of placing and receiving mobile phone calls, multimedia messaging (MMS), and sending and receiving email, but they can also access the Internet, are GPS-enabled, possess considerable processing power and large amounts of memory, and are equipped with high-resolution color liquid crystal displays capable of detecting touch input. As such, today's mobile phones are general purpose computing and telecommunication devices capable of running a multitude of applications. For example, modern mobile phones can run web browsers, navigation systems, media players and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves. This is not desirable, as users want their mobile phone to fit comfortably in their hand or in a shirt or pants pocket.

As a result, dual-display devices are becoming more popular. With a dual-display device, the mobile phone or tablet can include an open, expanded position where both displays are flush so that the user feels like there is a single integrated display. In a closed, condensed position, both displays are face-to-face so as to protect the displays. In a fully-open position, the dual displays can sit back-to-back so the user needs to flip the device to view the opposing display.

Hinges for such dual-display devices are problematic. Typically, the hinges can protrude from the device as it switches between positions. As devices continually become thinner, hinges need to be adapted to accommodate the thinner displays without further protrusion from the back of the device as it is opened and closed. Additionally, excess slack can make the two displays feel loosely connected. Other problems include that the displays do not open and close smoothly. Still yet another problem is the ability to stop the displays in any position as the displays are opened and closed. Torque or friction hinges are known and offer resistance to a pivoting motion. However, the friction hinges can be bulky and protrude from the device. Still another problem is to ensure the displays remain comfortably in the open, flush state, while the user holds one or both displays.

Therefore, it is desirable to provide improved hinges for multiple display devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hinge mechanism is disclosed wherein a multi-part device (e.g., dual-display device) can move to a snap-open position. For simplicity, the description herein is for dual-display devices, but the embodiments include or can be extended to multi-part devices wherein only one or more displays are used, but the different parts have a hinged connection allowing the parts to rotate relative to one another. In a snap-open position, the parts lock into place when they approach or are at 180 degrees of rotation relative to one another, which is the so-called open position. The locking force in the open position should be sufficient that holding or using the multi-part device does not cause an accidental closing action. For example, the locking force is sufficient that when holding one of the parts with two hands, the other part remains in the locked position. An unlocking force is required to unlock the device from the open position. Additionally, the locking force drops off precipitously when the two parts are unlocked and rotating away from the locked position. Thus, it is desirable that the device have a high force when the displays are within a predetermined angular range relative to one another (e.g., 175 degrees to 180 degrees), with increasing force the closer the angular rotation is to the locking position of 180 degrees. However, once the device is unlocked and outside of the predetermined angular range, the locking force drops off precipitously and the force required to rotate the parts relative to one another (hereinafter called the rotational force) is substantially constant.

In one embodiment, a two-part device, such as a dual-display device, has a hinged axis so that the parts can rotate relative to each other. A flexible connection member extends between the devices and has a fixed connection at one end within one of the devices. The opposite end of the flexible connection member is coupled to a first locking mechanism, which is slidable within the device as the parts rotate relative to each other around the hinged axis. A second locking mechanism has a fixed connection within the two-part device on a same side of the hinged axis as the first locking mechanism. With the two-part device in the open position, the first and second locking mechanisms couple together to lock the two-part device. However, when the two-part device is in a closed position, the first and second locking mechanisms are spaced apart. For example, the first locking mechanism can slide into contact with the second locking mechanism in the open position and can slide away from the second locking mechanism as the two-part device is unlocked and rotating away from the locked position.

In another embodiment, the first and second locking mechanisms are coupled through a magnetic attraction. For example, the first locking mechanism can be a ferromagnetic material (e.g., iron, nickel, cobalt and associated alloys) and the second locking mechanism can be a magnetic material (e.g., iron, nickel, cobalt and associated alloys), meaning that it is one of the ferromagnetic materials that has been magnetized.

In still other embodiments, a compression spring can be used to bias the slidable first locking mechanism towards the second locking mechanism when the flexible connection member has sufficient slack to allow such movement. The compression spring can be positioned at an angle with respect to the direction of movement of the first locking mechanism so that only a partial component of the force generated by the compression spring is exerted on the first locking mechanism. In this way, as the two-parts rotate away from the locked open position, the force exerted on the flexible connection member by the spring is relatively constant.

In another embodiment, the flexible connection member can be mounted within an adjustment system that allows increasing the tension of the flexible connection member after the two-part device is assembled. For example, one or more screws can be exposed when the two-part device is in a closed position. The screws can be tightened so as to move a retaining bracket attached to the flexible connection member, which increases the tension thereon.

The advantages of the hinged mechanism include the ability to lock the two-part device in an open position such that when the angular rotation of the parts is within a predefined range the device snaps open and locks in place. The magnets are sized to allow a user to break the magnetic connection so as to rotate the parts away from the open position, such as towards a closed position. Additionally, the angled compression spring allows the device to close without a substantial increase in rotational force. Finally, the flexible connection member can be tightened without taking the devices apart.

As described herein, a variety of other features and advantages can be incorporated into the technologies as desired.

DETAILED DESCRIPTION

Figure 1:
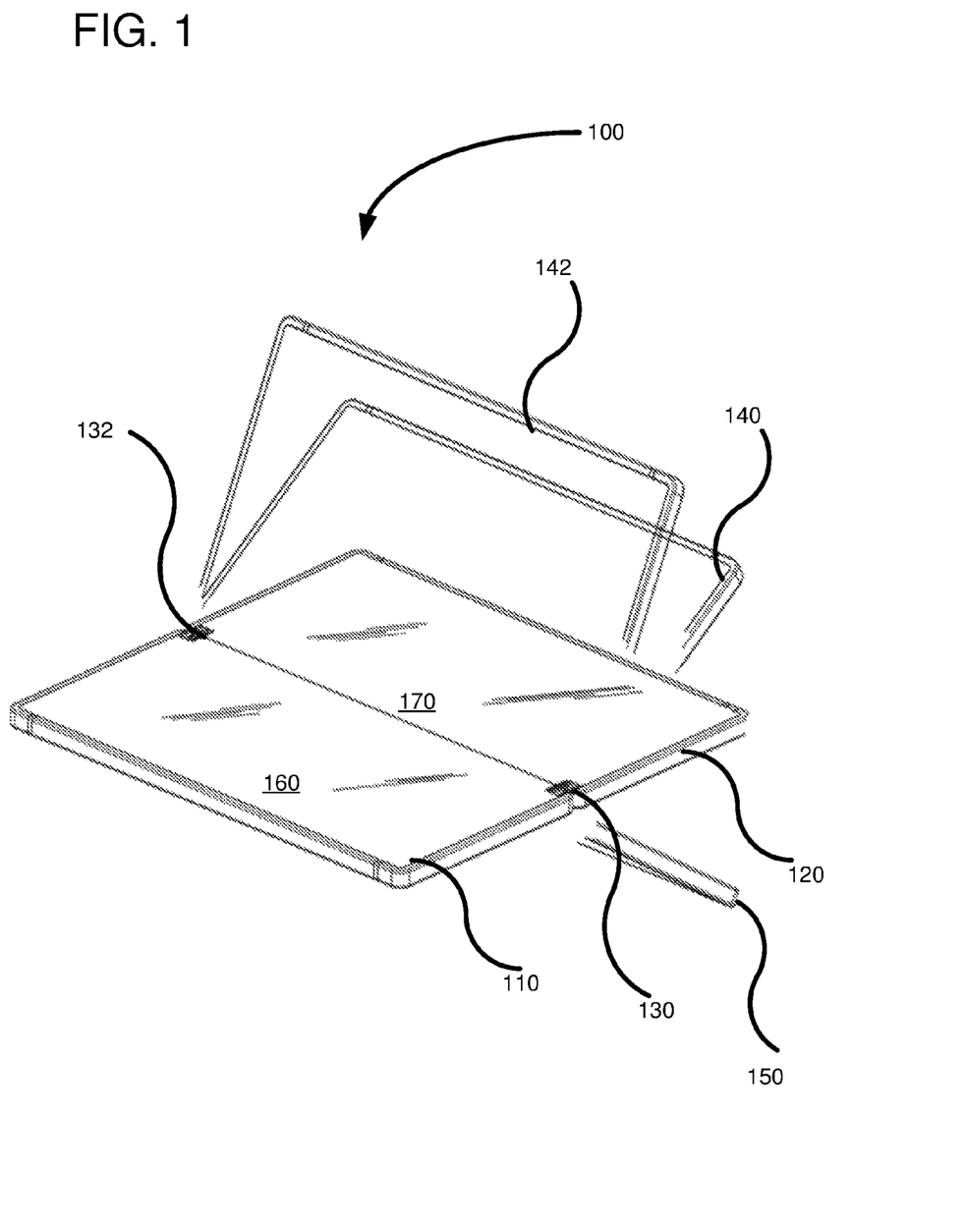
FIG. 1 shows a dual-display device coupled using hinges according to one embodiment described herein, wherein the dual-display device is shown rotating to various positions.

FIG. 1 shows an embodiment of a hinged mobile electronic device 100 (a two-part device) comprising a first display part 110 and a second display part 120 coupled together with one or more hinges 130, 132. The mobile electronic device 100 can be, for example, a hand-held device, such as a smart phone, or a portable computer, such as a lap-top. Each part 110, 120 can include a display and each part sits end-to-end with the hinges 130, 132 coupling the ends together with sufficient tension that the parts can pivot relative to each other around the ends. The mobile electronic device 100 is shown in an open position, also called a tablet mode, with the first and second display parts aligned in a plane so as to form a larger display area. As described further below, the mobile electronic device 100 snaps into the open position when a relative angle at which the parts sit is within a predetermined range (e.g., 175-180 degrees) so as to lock in the open position. As shown in phantom lines 140, 142, the second display part 120 can rotate counterclockwise relative to display part 110 or can rotate clockwise, as shown by phantom line 150. When the display parts are outside of the predetermined range, then the parts unlock as described further below. In the unlocked position, the hinges 130, 132 allow a full 360 degrees of rotation between the first and second display parts 110, 120. For purposes of brevity, the embodiments described herein are shown for two-display devices, but can be extended to additional display devices, such as 3 or more displays.

The first and second display parts 110, 120 can comprise a plurality of user interface screens 160, 170, respectively. The screens 160, 170 can be used for user input and/or display purposes. The screens 160, 170 can also be replaced with a plurality of smaller screens and/or other user interface mechanisms, such as a keyboard. Exemplary embodiments of the hinged mobile electronic device can comprise such user interface mechanisms on any surfaces and on any combination of surfaces as desired.

Figure 2A:
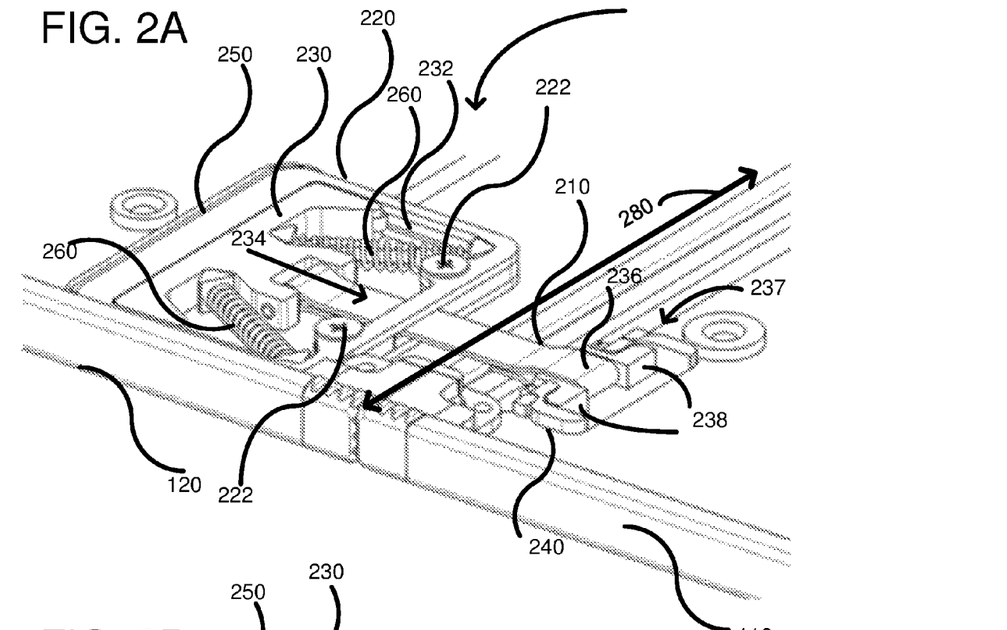
FIG. 2A shows the dual-display device with first and second parts in a locked, open position.

FIG. 2A shows the first and second parts 110, 120 in a snapped open position with the parts having top and bottom surfaces within the same plane. A hinge mechanism 200 includes a flexible connection member 210 coupled between the parts. The flexible connection member 210 is under tension so as to pull the first and second parts 110, 120 together. The flexible connection member 210, can be any of a variety of different materials including a strap, a cable, a wire, a conductor, a belt, an optical fiber, a chain, etc. In some embodiments, the flexible connection member 210 can be a communications path so that electrical signals (e.g., power or data) can be passed between the parts. For example, a cable, wire, conductor, or an optical fiber can be used to transmit power and/or data between parts. Other materials, such as a chain or belt can provide different advantages in terms or strength or flexibility.

The hinge mechanism 200 includes a frame 220, which is physically connected to the part 120 using screws 222 or other mounting means. A first locking mechanism 230 is slidably mounted within the frame 220 and moves in channels 232 along side walls of the frame. The first locking mechanism 230 moves in a direction defined by a longitudinal axis of the flexible connection member, as shown by arrow 234. The flexible connection member 210 is coupled at one end to the first locking mechanism 230 in any desired fashion, such as a loop-back and pin connection, which is illustrated. Other connection techniques can be used. At an opposite end 236 of the flexible connection member 210, is a retaining bracket 237 having two outwardly facing flanges 238. The retaining bracket 237 mounts in a retaining member 240 by using the outwardly facing flanges 238 to hook into the retaining member 240.

The first locking mechanism 230 is generally a ferromagnetic material (e.g., iron, nickel, cobalt and associated alloys). The ferromagnetic material can be non-magnetized but attracted to a magnet or the ferromagnetic material can be magnetized. In either case, the first locking mechanism 230 is designed to lock to a second locking mechanism 250 using magnetism. Thus, the second locking mechanism 250 can be a magnet that attracts the first locking mechanism 230 when they are in close proximity. The first locking mechanism 230 is generally T-shaped and has notches for receiving compression springs 260. The compression springs 260 are coupled in a corner of the frame 220 and angle inwardly to couple within the notches of the first locking mechanism. Different angles for the compression springs can be used, but generally angles between 40 and 60 degrees are used, such as the illustrated angle of about 45 degrees.

In operation, the compression springs 260 urge the first locking mechanism 230 towards the second locking mechanism 250. When the first locking mechanism 230 is within a predetermined distance from the second locking mechanism 250, the magnetic forces between the two increase to lock the two together with a snap-open click. The first locking mechanism 230 moves towards the second locking mechanism 250 when there is slack in the flexible connection member 210, which is when the first and second parts 110, 120 are in the open position. As described further below, when a user closes the parts, tension on the flexible connection member 210 increases to a threshold point sufficient to break the magnetic coupling force between the first and second locking mechanisms 230, 250. At that point, the first and second parts 110, 120 unlock from the open position and rotate with a substantially constant rotational force.

The parts 110 and 120 rotate relative to each other about an axis 280. Notably, both locking mechanisms 230, 250 are on the same side of the axis, unlike a typical configuration with one magnetized locking mechanism on one part and an oppositely polarized magnet on the other part to close the parts together. The flexible connection member 210 is shown passing between the parts and is fixedly connected to an opposite part to which the locking mechanisms are located. However, the flexible connection member can be fixedly connected to part 110 and both locking mechanisms can also be in part 110 if the flexible connection member simply loops over a pin in the part 120 and continues back into part 110.

Figure 2B:
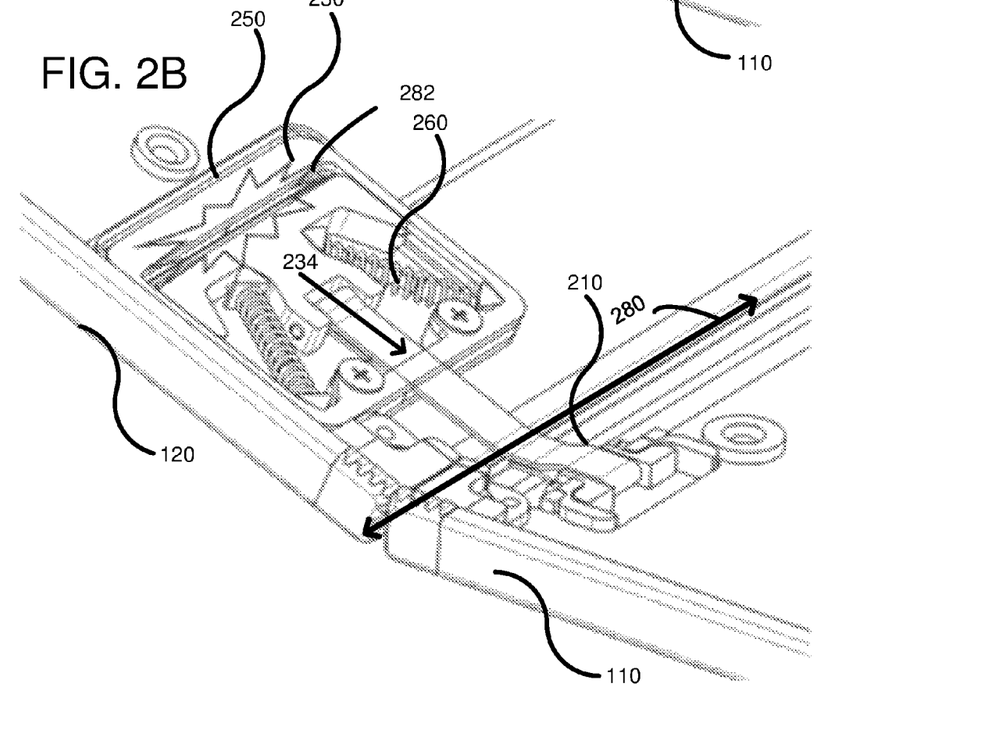
FIG. 2B shows that the first and second parts of the dual-display device are rotated relative to each other to break the locked connection.

FIG. 2B illustrates a transition from the locked, open state to an unlocked state due to the rotational energy caused by a user (not shown) rotating the part 120 relative to part 110. As the part 120 rotates about a hinged axis 280, the tension in flexible connection member 210 increases until it overcomes the magnetic force between the first and second locking mechanisms 230, 250 to break the connection there between, as is illustrated at 282. A gap opens between the first and second locking mechanisms 230, 250 and once the gap is a sufficient distance, the force due to magnetism decreases rapidly. The compression forces due to the springs 260 continue to resist rotation of the parts, but with a substantially constant force due to the angle of the springs 260 relative to the direction 234 of movement.

Figure 3A:
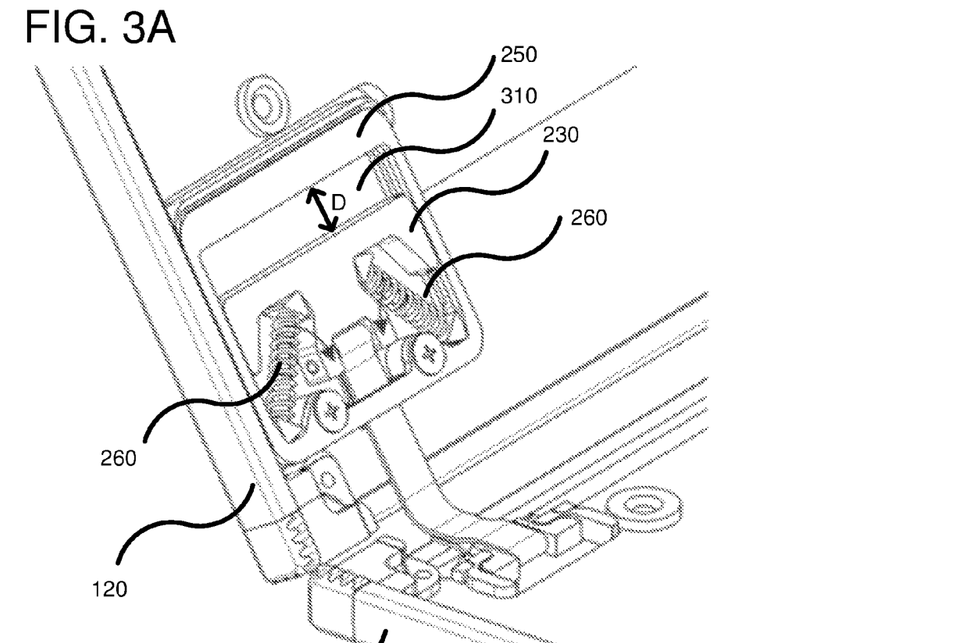
FIG. 3A shows the parts of dual-display device continued to be rotated so as to increase a distance between locking mechanisms.
Figure 3B:
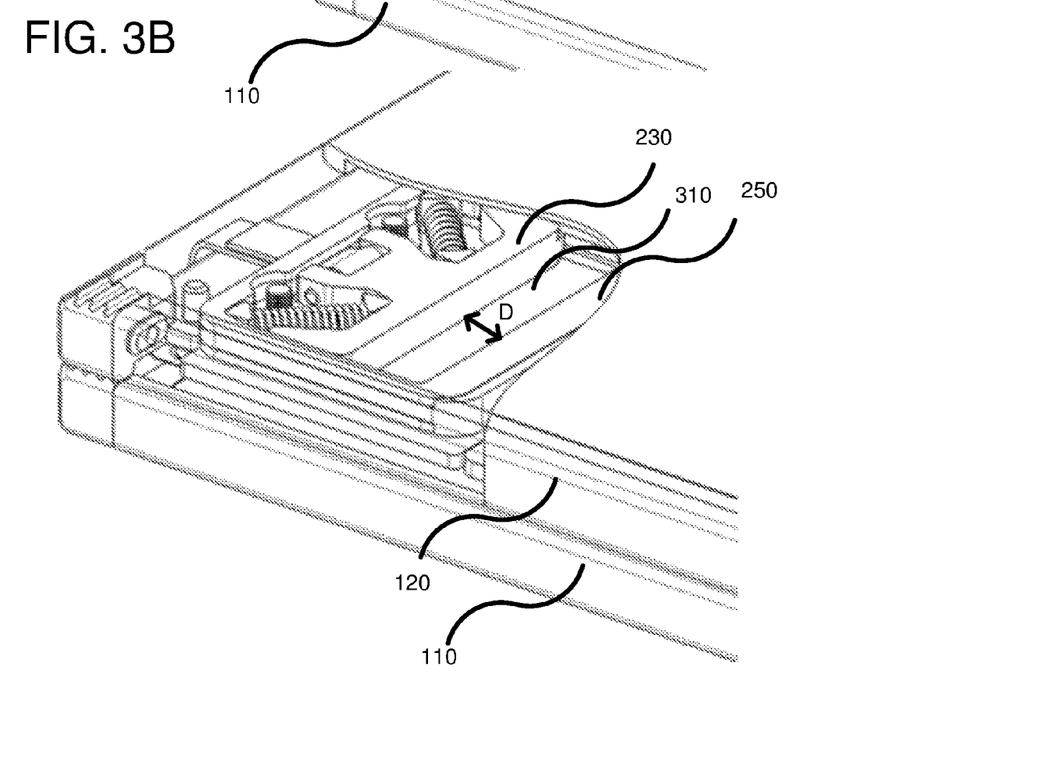
FIG. 3B shows the dual-display device in a closed position.

FIG. 3A shows a continued transition from the open state in FIG. 2A to a state where the parts 110, 120 are at nearly 90 degrees. As the part 120 continues to rotate relative to part 110, the gap shown at 310 opens to a distance D between the first and second locking mechanisms 230, 250 due to the limited reach of the flexible connection member. The compression spring force due to the springs 260 remains at a relatively constant value. FIG. 3B shows the parts 110, 120 in a closed state with the distance D (310) between the first and second locking mechanisms 230, 250 at a maximum.

Figure 4:
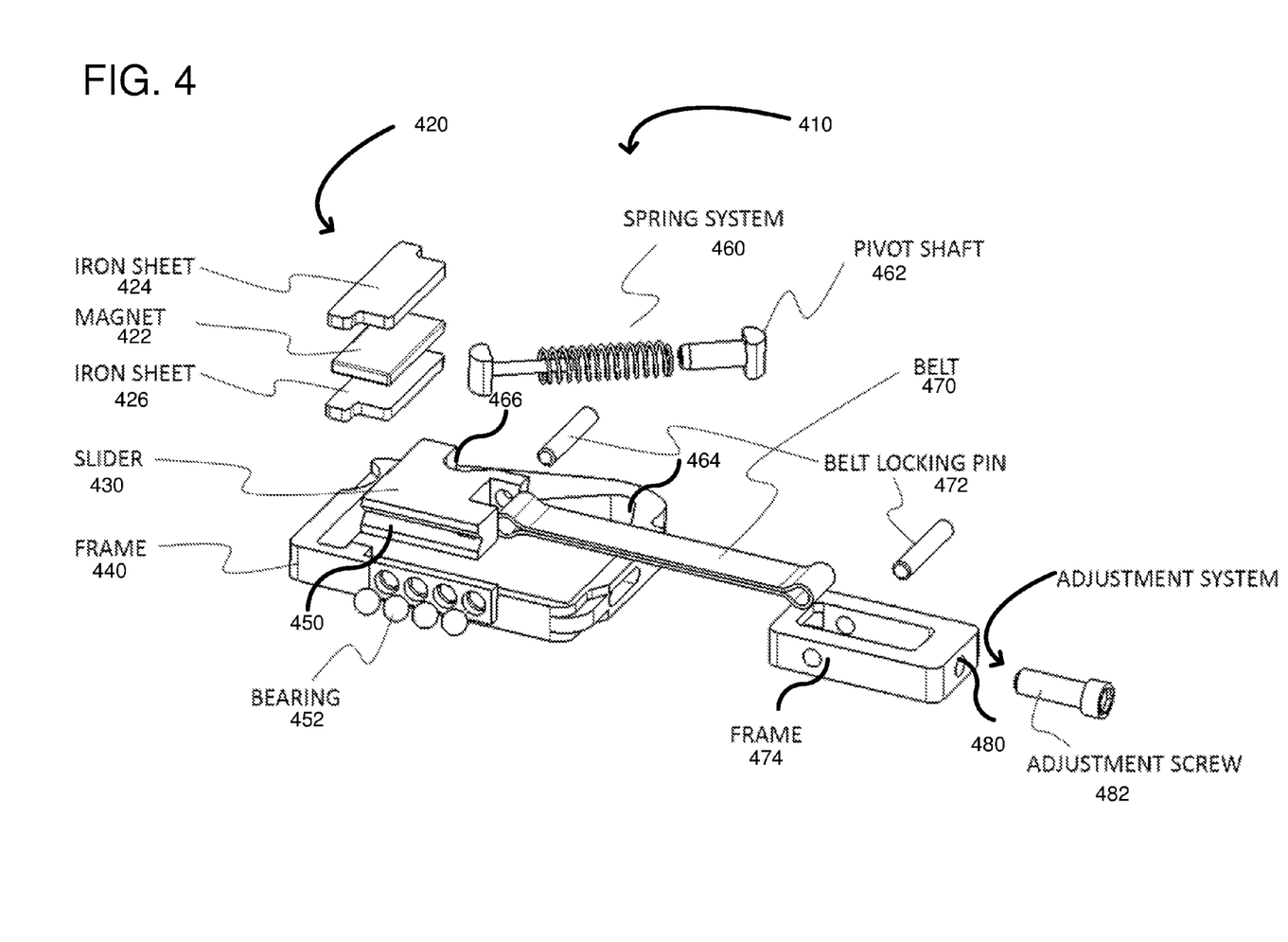
FIG. 4 shows an assembly drawing of a single-spring embodiment of the hinge mechanism.

FIG. 4 shows an assembly drawing of a hinge mechanism 410 according to another embodiment. In this embodiment, the second locking mechanism 420 is formed by a magnet 422 sandwiched between iron sheets 424, 426. The iron sheets serve to control the magnetic field formed by the magnet 422 so as to keep the magnetic field within the second locking mechanism. The iron sheets 424, 426 can be formed from any ferromagnetic material, such as those described above. A first locking mechanism 430 is labeled as a slider due to its function of sliding in a frame 440. In this embodiment, the first locking mechanism 430 has a channel 450 for receiving bearings 452 that allow the slider to move easily within the frame 440. A single spring 460 is used to bias the first locking mechanism 430 against the bearings 452 to allow low-friction sliding of the slider. The compression spring 460 is mounted on a pivot shaft 462 that extends from a corner 464 of the frame to a notch 466 on the first locking mechanism. A flexible connection member is shown as a belt 470 having loops at each end to receive belt locking pins 472. A frame 474 (also called a retaining member) has holes there through into which a belt locking pin 472 can be inserted to couple the belt 470 to the frame 474. A separate belt locking pin 472 couples the opposed end of the belt to the slider. The frame further includes a receptacle 480 for receiving an adjustment screw 482 that, when turned, moves the frame so as to increase or decrease tension on the belt 470. In this case, the frame 474 is slidable and the adjustment screw 482 moves the frame 474 so as to increase tension in the belt 470. There are a variety of different tightening techniques that can be used to increase tension in the flexible connection member and any known techniques can be used.

Figure 5:
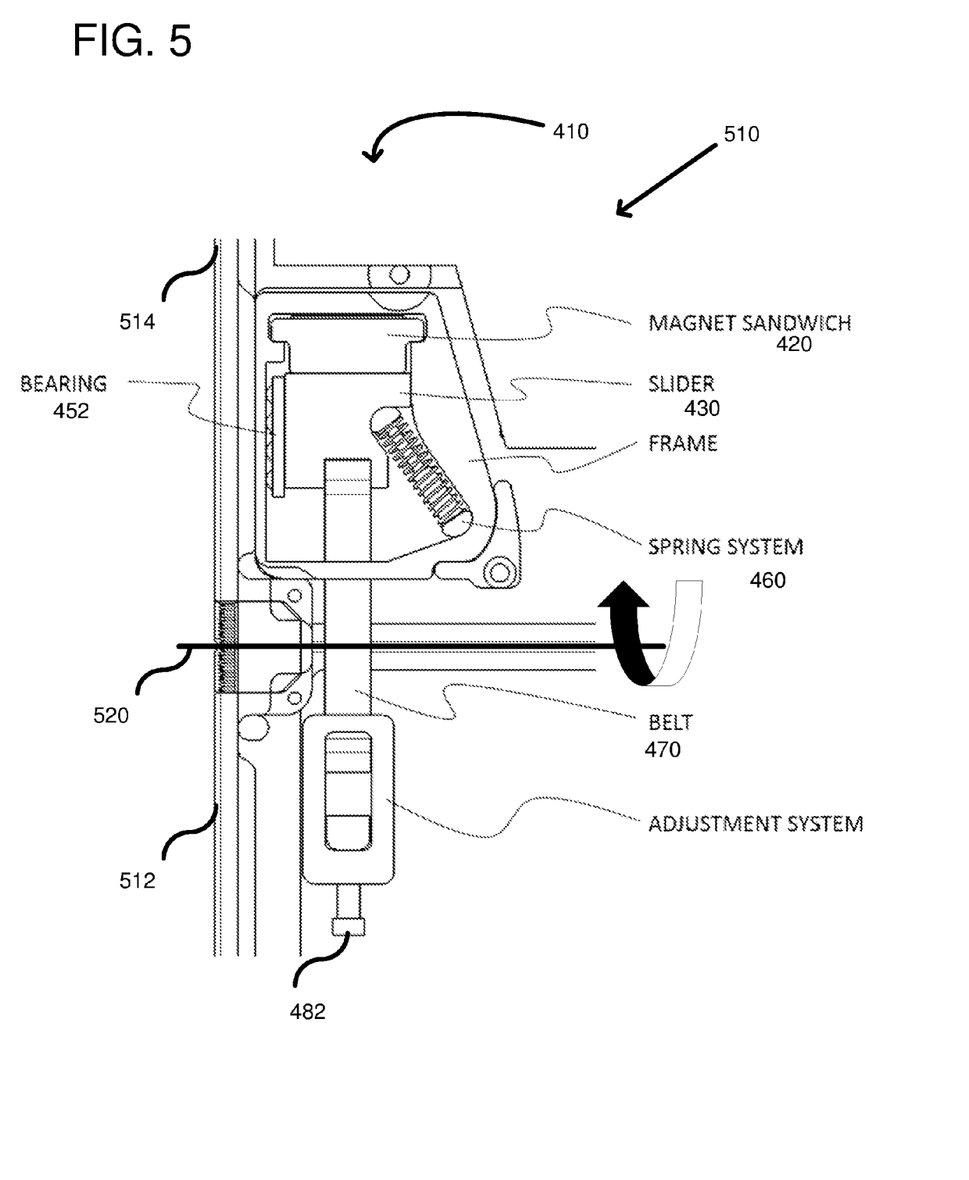
FIG. 5 shows the single-spring embodiment of the hinge mechanism in operable form.

FIG. 5 shows a top-down view of the hinge mechanism 410 assembled in a two-part device 510 having a first part 512 coupled to a second part 514. The parts 512, 514 are coupled end-to-end and rotate around an axis of rotation shown by 520. The parts 512, 514 are shown in a locked position with the first locking mechanism 430 in contact with the second locking mechanism 420 and the two parts 512, 514 positioned such that their top and bottom surfaces are within a same plane. The spring system 460 biases the first locking mechanism 430 (in this case a slider) towards the second locking mechanism 420. Due to the 45 degree angle of the spring relative to a direction of movement of the first locking mechanism 430, the spring energy is divided into X and Y components of force, with the X component of force pushing the first locking mechanism 430 against the bearings 452 and the Y component of force pushing the first locking mechanism 430 into contact with the second locking mechanism 420. The adjustment screw 482 can be turned so as to increase tension on the belt 470. To unlock the two parts 512, 514, the parts can be rotated about the axis 520 with sufficient force to overcome the magnetic attraction between the first and second locking mechanisms 430, 420.

Figure 6A:
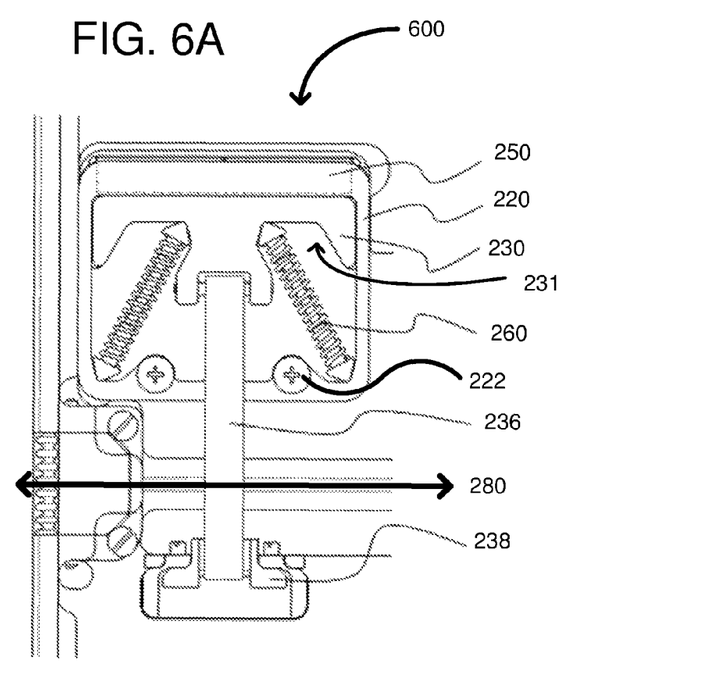
FIG. 6A shows a double-spring embodiment of the hinge mechanism in operable form.

FIG. 6A shows a top-down view of an embodiment of a hinge mechanism 600 that is described in FIG. 2. A first locking mechanism 230 is shown in contact with the second locking mechanism 250, both of which are in a frame 220. The springs 260 extend from a corner of the frame into a notch 231 of the first locking mechanism 230. The springs 260 sit at a 45 degree angle, but other angles can be used. The flexible connection member 236 pulls the first locking member 230 away from the second locking member 250 when sufficient force is exerted on the flexible connection member. Using the hinge mechanism 600, the parts can rotate around the illustrated axis 280.

Figure 6B:
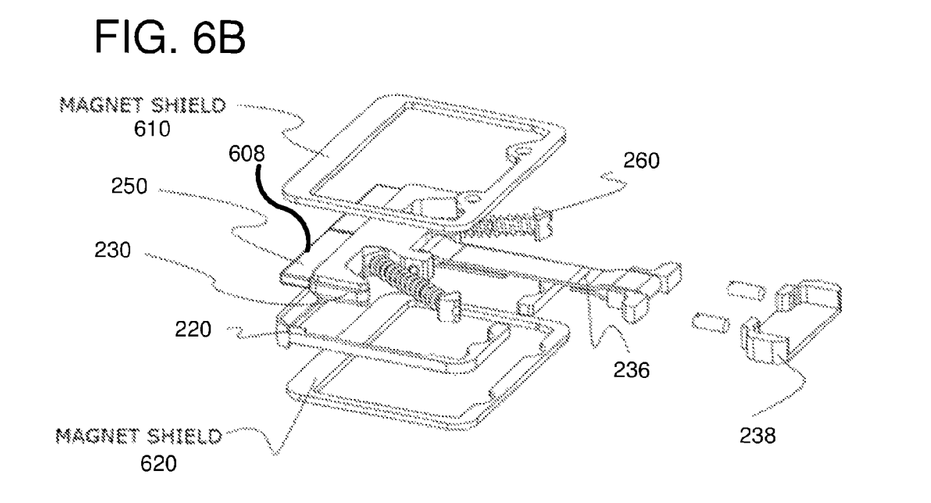
FIG. 6B shows an assembly drawing of the double-spring embodiment.

FIG. 6B shows an assembly drawing of the hinge mechanism 600. The second locking mechanism 250 is a magnet 608 sandwiched between top and bottom magnetic shields 610, 620. The magnetic shields are made of ferromagnetic material and ensure that the magnetic fields generated by the magnet 608 stay within a well-defined area so as to pass any necessary government testing of electromagnetic fields.

Figure 7:
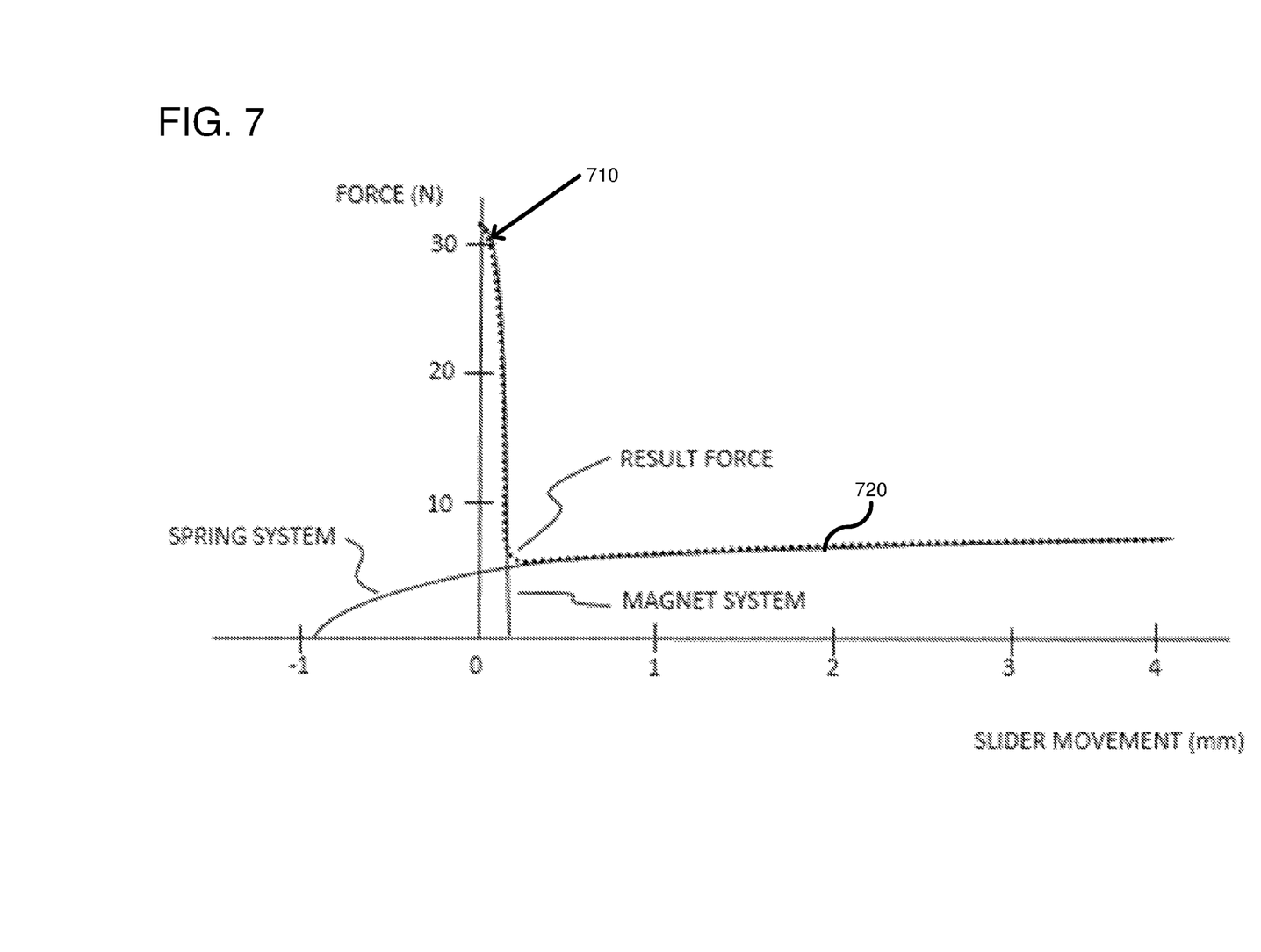
FIG. 7 shows a force-versus-position curve for the hinge mechanism.

FIG. 7 shows a force exerted on the first locking mechanism as it slides towards and away from the second locking mechanism. The force, in Newtons, is extremely high with the first locking mechanism in contact with the second locking mechanism, as shown at 710. As the first locking mechanism moves away from the second locking mechanism, the force decreases rapidly and then becomes substantially constant (e.g., varying by only 5 Newtons) as shown at 720.

Figure 8:
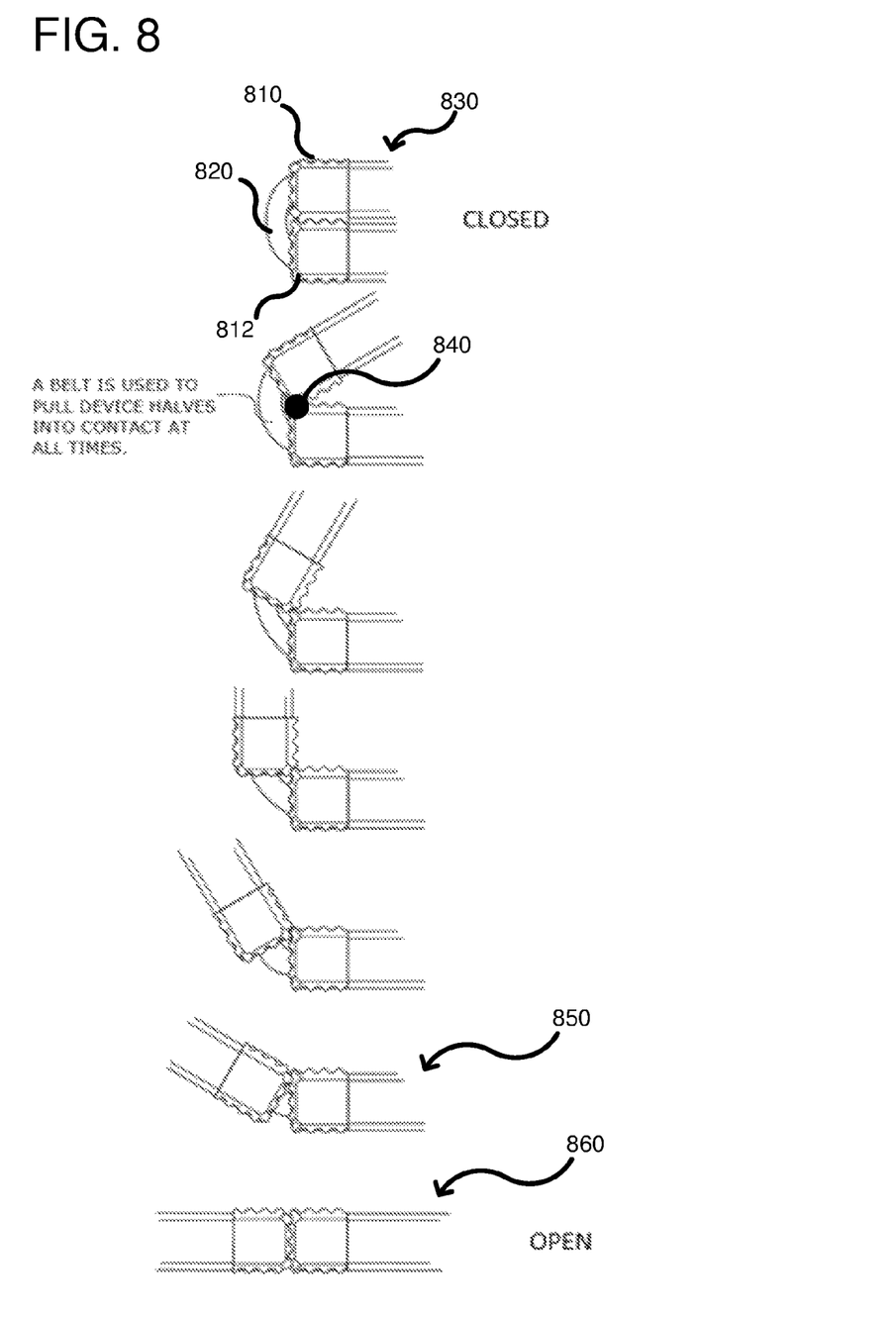
FIG. 8 shows an embodiment wherein serrated ends of the parts are used in conjunction with the hinge mechanism.

FIG. 8 shows ends 810, 812 of the first and second parts as serrated to facilitate rotation about the axis of rotation formed there between. Due to the tension on the flexible connection member 820, the ends 810, 820 remain in contact with one another through the rotation of the parts. At 830, the parts are in a closed position. As the first part rotates relative to the second part, the serrated edge defines the axis of rotation, shown at 840, and ensures that the ends do not slip so as to alter the axis of rotation. As the parts approach the open position at 850, the magnetic force increases to a point that the parts snap open with the locking devices clicking together so that the parts are in the open tablet mode, as shown at 860.

Figure 9:
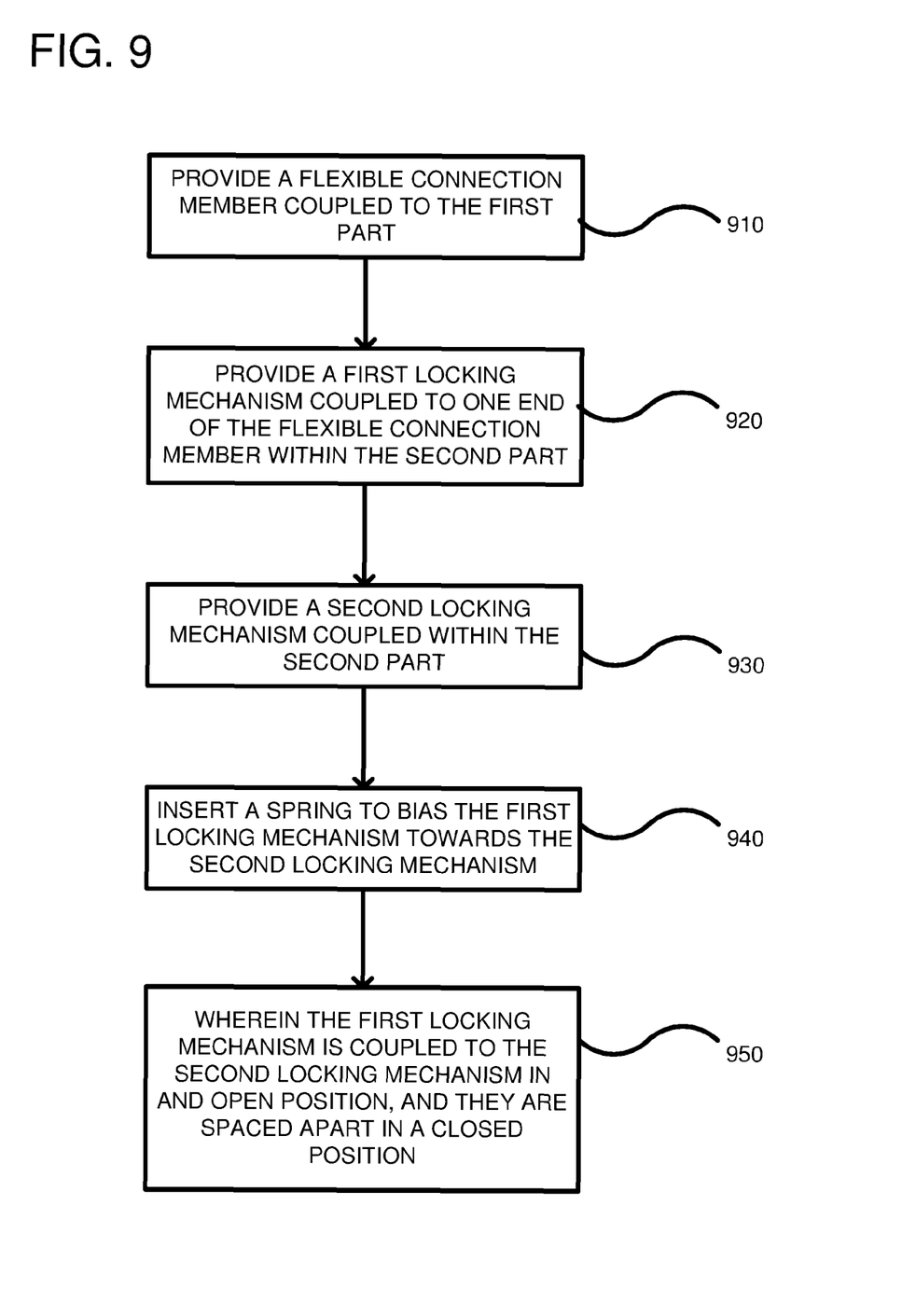
FIG. 9 is a flowchart of a method according to one embodiment for using the hinge mechanism.

FIG. 9 is a flowchart of a method according to one embodiment for connecting first and second parts using a hinged mechanism. In process block 910, a flexible connection member is coupled to the first part of the device. Typically, the flexible connection member has a first end that is a fixed connection within a retaining member on one of the parts. As described above, the retaining member can be moveable so as to increase tension on the flexible connection member. Alternatively, a retaining bracket coupled to the flexible connection member and used to mount the flexible connection member to the retaining member can be moveable so as to increase the tension. The flexible connection member can be any of a variety of materials, including, but not limited to a cable, a wire, a conductor, a belt, a strap, an optical fiber, or a chain.

In process block 920, a first locking mechanism is provided. The first locking mechanism can be a ferromagnetic material or a magnetic material of opposite polarity to a second locking mechanism. The first locking mechanism can have a variety of geometric shapes, but generally has at least one notch therein for receiving a spring. The first locking mechanism also has a connection means for connecting to the flexible connection member. Example connection means include having a receptable for receiving a locking pin that slides through a loop of the flexible connection member. Other connection means can be used.

In process block 930, a second locking mechanism is provided. The second locking mechanism can be ferromagnetic material or magnetic material of an opposite polarity to the first locking mechanism. There are a variety of combinations of materials for the first and second locking mechanisms but the materials should be so chosen that there is a magnetic attraction there between. The second locking mechanism can be fixed within a same part as the first locking mechanism. Thus, the first and second locking mechanisms can be on a same side of an axis of rotation between the two parts. The flexible connection member, by contrast, passes between the parts with tension so as to assist in maintaining ends of the parts in close proximity.

In process block 940, a spring is inserted within the part in which the first locking mechanism is located so as to push the first locking mechanism towards the second locking mechanism. As shown in process block 950, when the parts are in a closed position, with surfaces of the devices face-to-face, the tension on the flexible connection member is sufficient to maintain a gap between the first and second locking mechanisms. However, when the parts are in an open position, the flexible connection member has sufficient slack to allow the spring to push the first locking mechanism into contact with the second locking mechanism.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

The following paragraphs further describe embodiments of the hinge mechanism:

A. A hinge mechanism within an at least a two-part device having a hinged axis there between, comprising:

a flexible connection member having a first end coupled on one side of the hinged axis within one of the parts;

a first locking mechanism coupled to a second end of the flexible connection member, the first locking mechanism being slidable as the two parts rotate relative to each other around the hinged axis; and a second locking mechanism that is fixed on a same side of the hinged axis as the first locking mechanism, wherein the first and second locking mechanisms couple together to lock the two-part device in an open position and wherein the first and second locking mechanisms are spaced apart with the two-part device in a closed position.

B. The at least two-part device of paragraph A, wherein the first locking mechanism and the second locking mechanism are made from ferromagnetic material and magnetic material so that the two parts snap into the open position when the first and second locking mechanisms couple together.

C. The at least two-part device of paragraphs A or B, further including a frame in which the first locking mechanism slides towards and away from the second locking mechanism.

D. The at least two-part device of paragraphs A-C, further including a compression spring to bias the first locking mechanism towards the second locking mechanism.

E. The at least two-part device of paragraph D, wherein the compression spring is positioned at an angle with respect to a direction in which the first locking mechanism slides.

F. The at least two-part device of paragraphs A-E, wherein the flexible connection member is coupled to an adjustment frame that is moveable to tighten the flexible connection member.

G. The at least two-part device of paragraphs A-F, wherein the second locking mechanism is a magnet having top and bottom magnetic shields mounted thereto.

H. The at least two-part device of paragraphs A-G, wherein the flexible connection member is one of the following: a cable, a wire, a conductor, a belt, an optical fiber, or a chain.

I. The at least two-part device of paragraphs A-H, wherein the flexible connection member has the first end fixedly attached within a first of the two-part device and the first and second locking mechanisms are positioned within a second of the two-part device.

J. A method of coupling first and second devices using a hinge mechanism, comprising:

providing a flexible connection member coupled in the first device;

providing a first locking mechanism coupled to one end of the flexible connection member, the first locking mechanism slideably coupled within the second device;

providing a second locking mechanism coupled within the second device;

inserting a spring to bias the first locking mechanism towards the second locking mechanism;

wherein the first locking mechanism is coupled to the second locking mechanism with the first and second devices in an open position, and wherein the first and second locking mechanisms are spaced apart with the first and second devices in a closed position.

K. The method of paragraph J, wherein the first locking mechanism is a ferromagnetic material or a magnetic material and the second locking mechanism is a ferromagnetic material or a magnetic material so that the first locking mechanism and second locking mechanism have magnetic attraction there between.

L. The method of paragraphs J-K, wherein the spring is angled with respect to a direction in which the first locking mechanism slides.

M. The method of paragraphs J-L, wherein when the first device and second device approach the open position, the first locking mechanism and second locking mechanism have an attractive force that results in a snap open action between the first and second devices, and when the first and second devices approach a closed position, the spring generates a substantially constant force through a closing of the first and second devices.

N. The method of paragraphs J-M, further including adjusting a tension in the flexible connection member while the first and second devices are coupled together.

O. The method of paragraphs J-N, wherein adjusting the tension includes screwing a screw that pushes on a retaining bracket coupled to the flexible connection member.

P. A hinge for coupling first and second electronic devices, comprising:

a retaining member positioned on the first electronic device;

a flexible connection member having a retaining bracket at one end thereof mounted within the retaining member to secure the flexible connection member to the first electronic device;

a first locking mechanism made from ferromagnetic material or magnetic material coupled to an opposed end of the flexible connection member, the first locking mechanism housed within a second electronic device so that the flexible connection member extends between the first and second electronic devices;

a second locking mechanism made of ferromagnetic material or magnetic material that is magnetically attracted to the first locking mechanism, the second locking mechanism being within the second electronic device; and wherein the first locking mechanism and the second locking mechanism are positioned such that they are in contact with the first electronic device and second electronic device in an open position and they are spaced apart with the first electronic device and second electronic device in a closed position.

Q. The hinge of paragraph P, wherein the retaining member has at least one threaded receptacle there through in which a screw is mounted, and wherein an end of the screw is in contact with the retaining bracket to selectively increase tension in the flexible connection member.

R. The hinge of paragraphs P-Q, further including a spring positioned within the second electronic device and coupled to urge the first locking mechanism towards the second locking mechanism.

S. The hinge of paragraphs P-R, wherein first locking mechanism is slidable within the second electronic device along an axis and the spring bears on the first locking mechanism at an angle with respect to the axis.

T. The hinge of paragraphs P-S, wherein the flexible connection member is one of the following: a cable, a wire, a conductor, a belt, an optical fiber, or a chain.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A hinge mechanism within an at least a two-part device having a hinged axis connecting the two parts, comprising:
   a flexible connection member having a first end coupled to a first part of the two-part device;
   a first locking mechanism coupled to a second end of the flexible connection member and positioned within a second part of the two-part device, the first locking mechanism being slidable relative to the second part as the two parts rotate relative to each other around the hinged axis;
   a second locking mechanism that is fixed on the second part of the two-part device, wherein the first and second locking mechanisms couple together to lock the two parts in an open position and wherein the first and second locking mechanisms are uncoupled with the two parts in a closed position; and
   a compression spring disposed in the second part to bias the first locking mechanism towards the second locking mechanism.

2. The hinge mechanism of claim 1, wherein the first locking mechanism and the second locking mechanism are made from ferromagnetic material and magnetic material so that the two parts snap into the open position when the first and second locking mechanisms couple together.

3. The hinge mechanism of claim 1, further including a frame in which the first locking mechanism slides towards and away from the second locking mechanism.

4. The hinge mechanism of claim 1, wherein the compression spring is positioned at an angle with respect to a direction in which the first locking mechanism slides.

5. The hinge mechanism of claim 1, wherein the flexible connection member is coupled to an adjustment frame that is moveable to tighten the flexible connection member.

6. The hinge mechanism of claim 1, wherein the second locking mechanism is a magnet having top and bottom magnetic shields mounted thereto.

7. The hinge mechanism of claim 1, wherein the flexible connection member is one of the following: a cable, a wire, a conductor, a belt, an optical fiber, or a chain.

8. The hinge mechanism of claim 1, wherein the flexible connection member has the first end fixedly attached within a first of the two-part device and the first and second locking mechanisms are positioned within a second of the two-part device.

9. A method of coupling first and second devices using a hinge mechanism, comprising:
   providing a flexible connection member coupled in the first device;
   providing a first locking mechanism coupled to one end of the flexible connection member, the first locking mechanism slideably coupled within the second device;
   providing a second locking mechanism coupled within the second device;
   inserting a spring to bias the first locking mechanism towards the second locking mechanism;
   wherein the first locking mechanism is coupled to the second locking mechanism with the first and second devices in an open position, and wherein the first and second locking mechanisms are spaced apart with the first and second devices in a closed position.

10. The method of claim 9, wherein the first locking mechanism is a ferromagnetic material or a magnetic material and the second locking mechanism is a ferromagnetic material or a magnetic material so that the first locking mechanism and second locking mechanism have magnetic attraction there between.

11. The method of claim 9, wherein the spring is angled with respect to a direction in which the first locking mechanism slides.

12. The method of claim 9, wherein when the first device and second device approach the open position, the first locking mechanism and second locking mechanism have an attractive force that results in a snap open action between the first and second devices, and when the first and second devices approach a closed position, the spring generates a substantially constant force through a closing of the first and second devices.

13. The method of claim 9, further including adjusting a tension in the flexible connection member while the first and second devices are coupled together.

14. The method of claim 13, wherein adjusting the tension includes screwing a screw that pushes on a retaining bracket coupled to the flexible connection member.

15. A hinge for coupling first and second electronic devices, comprising:
   a retaining member positioned on the first electronic device;
   a flexible connection member having a retaining bracket at one end thereof mounted within the retaining member to secure the flexible connection member to the first electronic device;
   a first locking mechanism made from ferromagnetic material or magnetic material coupled to an opposed end of the flexible connection member, the first locking mechanism housed within a second electronic device so that the flexible connection member extends between the first and second electronic devices;
   a second locking mechanism made of ferromagnetic material or magnetic material that is magnetically attracted to the first locking mechanism, the second locking mechanism being within the second electronic device; and
   wherein the first locking mechanism and the second locking mechanism are positioned such that they are in contact with each other when the first electronic device and second electronic device in an open position and they are spaced apart when the first electronic device and second electronic device are in a closed position.

16. The hinge of claim 15, wherein the retaining member has at least one threaded receptacle there through in which a screw is mounted, and wherein an end of the screw is in contact with the retaining bracket to selectively increase tension in the flexible connection member.

17. The hinge of claim 15, further including a spring positioned within the second electronic device and coupled to urge the first locking mechanism towards the second locking mechanism.

18. The hinge of claim 17, wherein first locking mechanism is slidable within the second electronic device along an axis and the spring bears on the first locking mechanism at an angle with respect to the axis.

19. The hinge of claim 15, wherein the flexible connection member is one of the following: a cable, a wire, a conductor, a belt, an optical fiber, or a chain.

20. A hinge mechanism in an at least a two-part device having a hinged axis connecting the two parts, comprising:
   a flexible connection member having a first end coupled to a first part of the two-part device;
   a first locking mechanism coupled to a second end of the flexible connection member and positioned within a second part of the two-part device, the first locking mechanism being slidable relative to the second part as the two parts rotate relative to each other around the hinged axis;
   a second locking mechanism that is fixed on the second part of the two-part device, wherein the first and second locking mechanisms couple together to lock the two parts in an open position and wherein the first and second locking mechanisms are uncoupled with the two parts in a closed position; and
   wherein the first locking mechanism and the second locking mechanism are made from ferromagnetic material and magnetic material so that the two parts snap into the open position when the first and second locking mechanisms couple together.

21. A hinge mechanism within an at least a two-part device having a hinged axis connecting the two parts, comprising:
   a flexible connection member having a first end coupled to a first part of the two-part device;
   a first locking mechanism coupled to a second end of the flexible connection member and positioned within a second part of the two-part device, the first locking mechanism being slidable relative to the second part as the two parts rotate relative to each other around the hinged axis;
   a second locking mechanism that is fixed on the second part of the two-part device, wherein the first and second locking mechanisms couple together to lock the two parts in an open position and wherein the first and second locking mechanisms are uncoupled with the two parts in a closed position; and
   wherein the second locking mechanism is a magnet having top and bottom magnetic shields mounted thereto.

* * * * *